G. W. OUSLEY.
WIPER FOR AUTOMOBILE WIND SHIELDS.
APPLICATION FILED APR. 7, 1915.
1,169,280.
Patented Jan. 25, 1916.
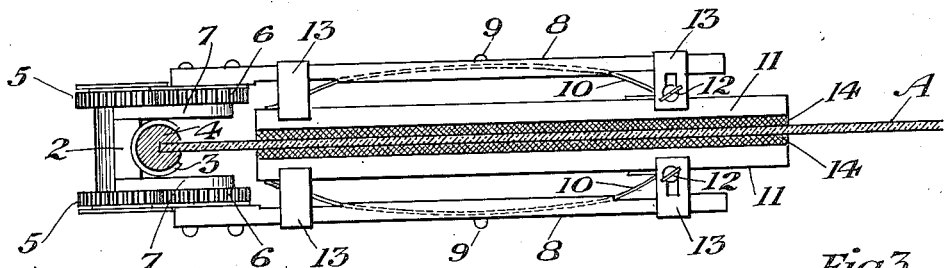
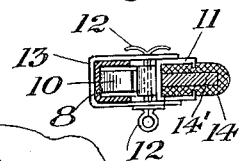
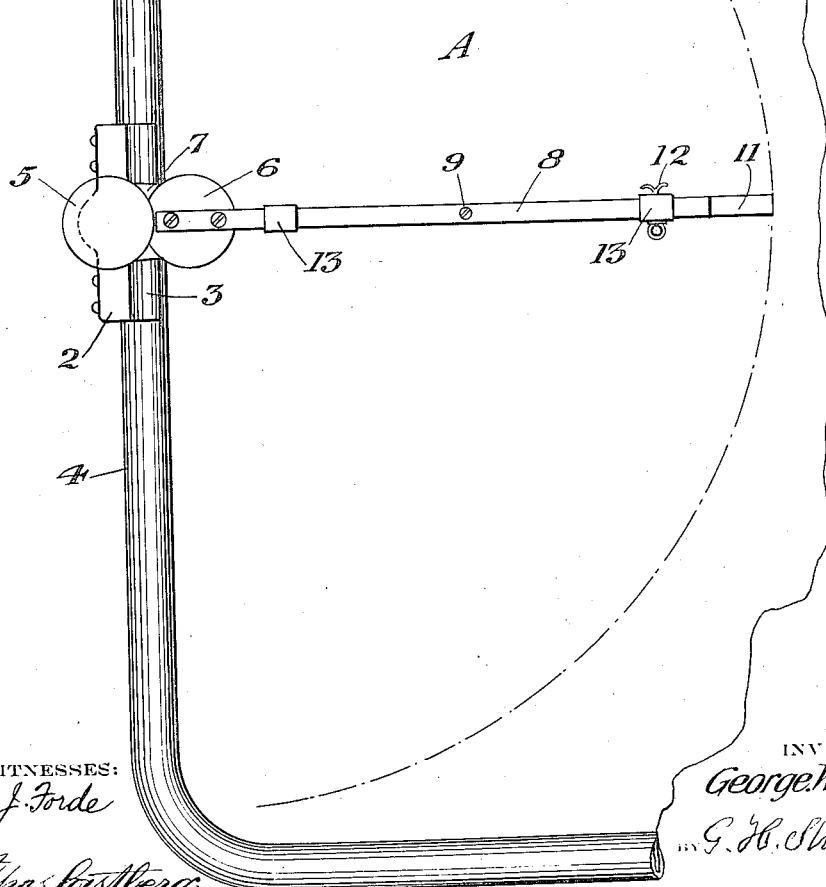
WITNESSES:
L. J. Forde
Theo. Fastberg
INVENTOR
George W. Ousley
BY G. H. Strong
ATTORNEY

UNITED STATES PATENT OFFICE.

GEORGE W. OUSLEY, OF SAN FRANCISCO, CALIFORNIA.

WIPER FOR AUTOMOBILE WIND-SHIELDS.

1,169,280.

Specification of Letters Patent.  Patented Jan. 25, 1916.

Application filed April 7, 1915.  Serial No. 19,720.

*To all whom it may concern:*

Be it known that I, GEORGE W. OUSLEY, a citizen of the United States, residing in the city and county of San Francisco and State of California, have invented new and useful Improvements in Wipers for Automobile Wind-Shields, of which the following is a specification.

This invention relates to means for wiping condensed moisture from panes of glass or other transparent elements and particularly is adaptable to wind shields of automobiles.

This invention is an improvement of the type of wiper disclosed in my application Ser. No. 873,476, filed November 23, 1914.

The object of this invention is to provide a device, having coördinate wiping members movable over a large area of the glass pane of an automobile wind shield, which may be readily applied and detached without extraneous devices, and which is neat, ornamental, simple and practical.

The invention consists of the parts and the construction and combination of parts as hereinafter more fully described and claimed, having reference to the accompanying drawings, in which—

Figure 1 is an elevation of a fragment of an automobile wind shield with the device attached. Fig. 2 is a vertical section in a plane at right angles to Fig. 1, showing the device in side view. Fig. 3 is a detail sectional view of the arm and holder.

In my present invention the device comprises a stationary or clamp part 2, with a split tube 3 of such contour as to resiliently and snugly clasp the frame 4 of an automobile wind shield A. Rigidly connected and turnably mounted on the opposite sides of the clamp 2 is a pair of twin gears 5—5 which mesh with respective gears 6—6 turnably mounted upon parallel, pendent extensions 7—7, of the clamp 2, overlapping the pane of the wind shield.

Securely fastened on each gear 6 is a hollow arm 8 in which is secured, by a screw 9, a bow spring 10. The ends of this spring project toward the median line between the pair of arms 8—8 and react on the adjacent back of a respective holder 11, of which there is one for each arm. Each holder is pivoted at one end, as by a cotter pin 12, to and in a U-shaped guide 13, of which there are two secured or formed on each arm. The holders may be of channel form and in each is a strip 14 of suitable wiping material which may be renewed.

In practice, the device is readily attached to the frame 4 by pressing the wiper holders 11 back against their springs 10—10 so that space is provided for the clearance of the frame. The holders are then released and will spring toward and rest upon adjacent sides of the interposed glass. The spring tube 3 is then forced firmly into the desired position on the frame 4.

To clean the two surfaces of the glass, it is only necessary to grasp the adjacent arm 8 and swing it, whereupon, through means of its gear 6, the two gears 5—5 are rotated equally and thereby the outer gear 6 and its arm 8 turn. The arms are here shown as parallel in a common plane and hence swing substantially uniformly over the glass. A large circular area or surface is thus effectually and quickly cleaned.

An advantage of this construction is that by simply removing a cotter pin from a holder 11 this may be readily withdrawn by endwise movement from the guides 13 which allow play of the holders against their springs but prevent lateral play.

It is understood that the body or clamp part may be altered and adapted for application to divers structures as may be necessary in practice.

A simple, efficient and practicable form of wiper construction is shown which consists of a piece of cloth 14 folded longitudinally over a core bar of harder material 14', the cloth being clenched by the holder 11.

Having thus described my invention, what I claim and desire to secure by Letters Patent is—

1. An automobile wind shield glass cleaner, comprising a clamp removably attached to the wind shield frame, intermeshing gears journaled upon opposite sides of the clamp and turnable in unison, arms fixed to the innermost gears and extending upon opposite sides of the glass, springs carried by each arm, and wiper holders upon which the springs press to maintain a wiping contact with the glass.

2. In a wind shield glass cleaner, a clamp removably attached to the shield frame, a pair of gears fixed to opposite ends of a shaft extending across the clamp, and turnable in unison, a second pair of gears independently journaled to the clamp and meshing with the first-named gears; arms fixed to said second gears and extending parallel upon opposite sides of the glass, wiper carriers extending parallel with the glass and interior to the arms, and springs carried by the arms and acting to maintain the wipers in contact with the glass.

3. In a wind shield glass cleaner, a clamp removably attached to the shield frame, a pair of gears fixed to opposite ends of a shaft extending across the clamp, and turnable in unison, a second pair of gears independently journaled to the clamp and meshing with the first-named gears; arms fixed to said second gears and extending parallel upon opposite sides of the glass, wiper carriers extending parallel with the glass and interior to the arms, and springs carried by the arms and acting to maintain the wipers in contact with the glass, and guides connecting the arms and wiper holders, within which said holders are movable to allow them to be removed and replaced.

In testimony whereof I have hereunto set my hand in the presence of two subscribing witnesses.

GEORGE W. OUSLEY.

Witnesses:
JOHN H. HERRING,
W. W. HEALEY.